Dec. 2, 1930.   C. M. DIBBLE   1,783,183
BROILER
Filed Sept. 26, 1927   2 Sheets-Sheet 1

Dec. 2, 1930. C. M. DIBBLE 1,783,183
BROILER
Filed Sept. 26, 1927   2 Sheets-Sheet 2
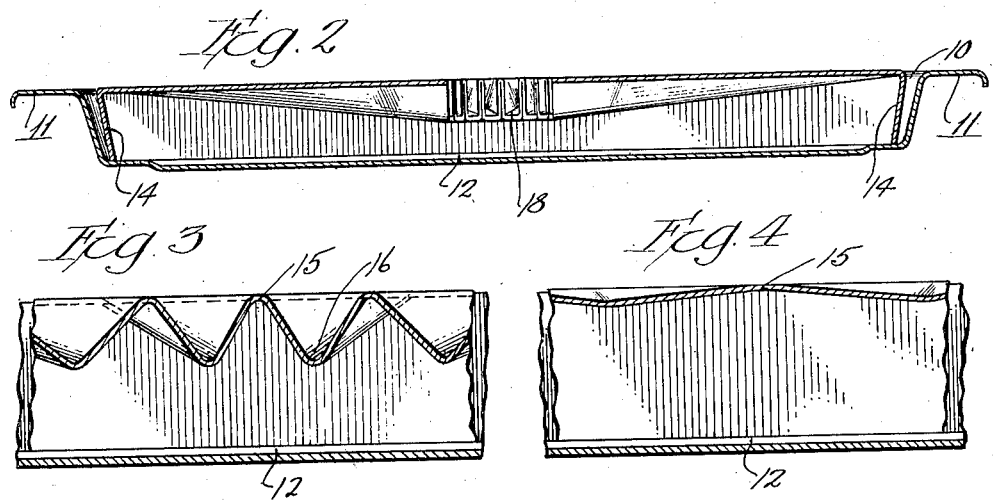
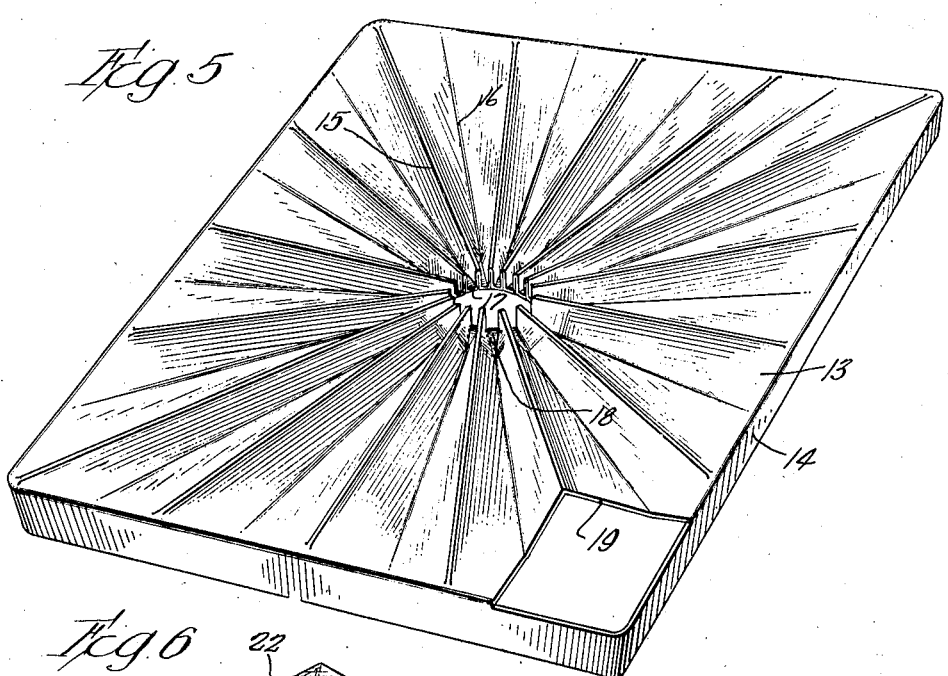
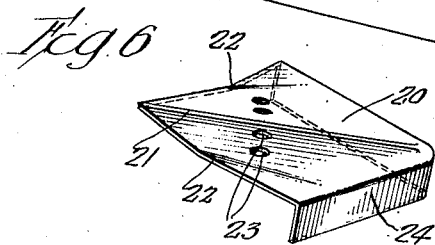

Patented Dec. 2, 1930

1,783,183

UNITED STATES PATENT OFFICE

CLAUDE M. DIBBLE, OF JOLIET, ILLINOIS, ASSIGNOR TO MOORE BROTHERS COMPANY, OF JOLIET, ILLINOIS, A CORPORATION OF ILLINOIS

BROILER

Application filed September 26, 1927. Serial No. 222,032.

This invention relates in general to a cooking pan or receptacle of simple and improved construction, and more particularly to a broiler tray or construction.

A principal object of the invention is the provision of a combined drip pan and grid for a broiler.

Another important object of the invention is the provision of a corrugated grid structure which is easily cleaned.

Another important object of the invention is the provision of a grid and drip pan in a single piece which is strong and, therefore, not liable to damage.

Another important object of the invention is the provision of a combined drip pan and grid with draining corrugations.

A still further important object of the invention is the provision of a liquid removing or basting opening.

Numerous other objects and advantages of the invention will be apparent as it is better understood from the following description, which, taken in connection with the accompanying drawings, discloses a preferred embodiment thereof.

In the drawings:

Fig. 2 is a section taken on the line 2—2 of Fig. 1;

Figure 1:
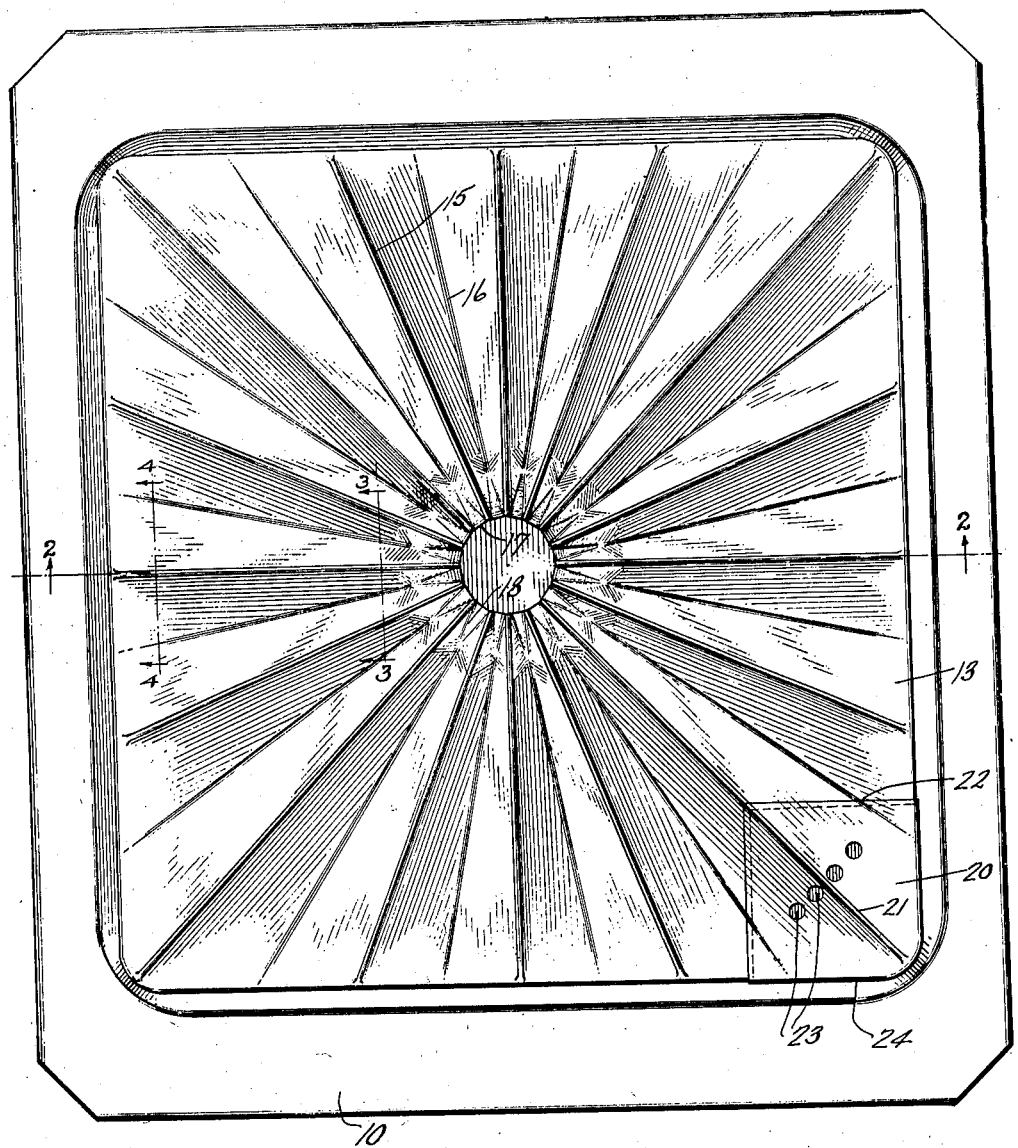
Figure 1 is a plan view of a broiler tray and a receptacle constructed in accordance with the principles of this invention.

Figs. 3 and 4 are detail sections taken on the lines 3—3 and 4—4 respectively of Fig. 1;

Fig. 5 is a perspective of a combined tray and grid showing the basting opening; and Fig. 6 is a perspective of the basting opening cover.

It has heretofore been customary to provide a broiler tray for cook stoves with a drip pan and over the drip pan to place a separate grid of wire upon which the meat, or other material to be cooked, is supported. This construction requires two separate members, a drip pan and a grid, both of which substantially fill the tray or the opening thereof, so that if it is desired to baste the meat upon the grid, both the grid and the drip pan must be raised in the tray in order to reach the liquid contained by the tray.

The present invention overcomes these objections by combining the structures of the drip pan and the grid in a single member and by providing that member with an opening so that any liquid in the tray which contains the combined member may be accessible for basting, or for removing, without raising the combined drip pan and grid and without withdrawing the tray from the cooking compartment since the basting opening is located at one corner of the tray which is usually accessible from the door of an oven or compartment in which the tray is placed.

Referring more particularly to the drawings, a tray 10 is shown, of ordinary construction, having extending flanges 11 and with a dished or recessed bottom 12. This pan or tray 10 is used in the ordinary manner in a cook stove and provides a sufficient recess for containing a combined drip pan and grid 13 in the recess of the pan.

The combined drip pan and grid 13 is formed or stamped of a single sheet of metal and has a continuous depending edge 14 inclined inwardly so that it will fit snugly within the tray 10, the lower edge of the depending portion 14 being supported by the edge of the bottom of the tray or pan 10. The top of the pan 13 is formed with alternate ridges 15 and grooves 16 extending radially from a central opening 17, the upper portions of the ridges being substantially in the plane of the upper face and edge of the sheet from which the combined pan and grid 13 is made, and the ridges and grooves constituting radial corrugations extending from the center opening. The ridges 15 do not extend closely together around the central opening but are spaced apart and the grooves surrounding the center have a flattened or widening portion 18 rather than an angular notched discharge at this place. This construction tends to prevent the accumulation of particles of meat around the center and allows the liquid to wash any such particles from the flattened portion 18 into the opening 17. The flattened portion 18 is at a height above the lower edge of the depending flange 14 so that any drippings which fall upon the corrugated surface of the pan will fall through the opening 17 and into the bottom of the tray 10 below.

At one corner of the pan 13 is an opening 19 cut from the top surface of the pan but leaving the flange at the corner intact. This opening 19 may be of any desired shape but is preferably square or rectangular as shown. A cover 20 is provided for the opening 19 which has a ridge 21 and grooves 22 corresponding to the adjacent ridges and grooves of the pan. It is also formed with a number of openings 23 by means of which the cover can be removed by the insertion of a sharp instrument, such as a fork or the like. Two of the sides of the cover are continued to form a depending flange 24 which fits over the flange 14 of the pan when the cover is applied thereto. The other edges of the cover are also of sufficient length to slightly overlap the edges of the opening 19, as shown more clearly in Fig 1.

In this construction a grid and drip pan are combined in a single stamping which provides an inclined dripping surface communicating with a center opening, the surfaces of the pan on both sides thereof being smooth and continuous so that they are easily cleaned, affording no surface for the collection of dirt, and strengthening the structure of the pan so that a relatively thin metal sheet will form a strong pan and grid.

In basting the meat or removing surplus liquid from the pan or tray 10, it is necessary only to lift the comparatively small and light cover 20 from one corner of the pan 13, whereupon the liquid can be easily removed or ladeled with the other hand, it being unnecessary to raise the entire pan 13 with the meat thereon to get at the liquid below or for basting.

It is thought that this invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:

1. A drip pan having a draining opening and a plurality of grooves radiating from the opening, the ends of the grooves adjacent the opening widening out to a flattened discharge edge.

2. A combined drip pan and grid comprising a sheet metal stamping with a central opening and corrugations radiating therefrom, the ridges forming the grid surface and the grooves forming drip channels, the extremities of the groove adjacent the opening being flattened and the ends of the ridges being compressed to form gradually widening discharge lips at the ends of the grooves.

3. A drip pan having a depending flange edge and means for discharging drippings upon the surface thereof to the under side of the pan, and with a basting opening in the edge adjacent but not including the flange.

4. The combination with a tray having an interior depression of a drip pan and grid therefor, comprising a metal stamping and a depending flange and having a draining opening with corrugations radiating from the opening, the ridges of which constitute a grid surface and the depressions of which form conveying channels, and a basting opening in one edge of the pan for removing liquid from the tray without raising the pan.

5. The combination with a tray having an interior depression, of a combined drip pan and grid comprising a sheet metal stamping with a central opening and corrugations radiating therefrom, and with a depending marginal flange inclined inwardly below the stamping to fit within the recess of the tray, the ridges of the corrugations forming a grid-like surface at the level of the edges of the tray and the opening forming a discharge for the grooves between the ridges, the edge of the opening being above the bottom of the tray.

6. A broiler, comprising a metallic plate having a central drainage opening and a top radially corrugated from the surrounding edge of the plate to said central drainage opening, said corrugations being constituted of substantially horizontal ridges which provide a supporting grid, and of alternate, inclined grooves which provide channels for the drainage of the drippings from the grid into said drainage opening.

7. A broiler, comprising a metallic plate having a central drainage opening and a top radially corrugated from the surrounding edge of the plate to said central drainage opening, said corrugations being constituted of ridges which provide a supporting grid, and of alternate grooves which provide channels for the drainage of the drippings from the grid into said drainage opening.

CLAUDE M. DIBBLE.